(12) United States Patent
Mayer

(10) Patent No.: US 7,219,698 B2
(45) Date of Patent: May 22, 2007

(54) DEVICE FOR GENERATING A MIXTURE OF REDUCING AGENT AND AIR

(75) Inventor: Hanspeter Mayer, Adnet (AT)

(73) Assignee: Robert Bosch GmbH, Stuttgart (DE)

( * ) Notice: Subject to any disclaimer, the term of this patent is extended or adjusted under 35 U.S.C. 154(b) by 696 days.

(21) Appl. No.: 10/362,012

(22) PCT Filed: Aug. 7, 2001

(86) PCT No.: PCT/DE01/03022

§ 371 (c)(1),
(2), (4) Date: Aug. 1, 2003

(87) PCT Pub. No.: WO02/13951

PCT Pub. Date: Feb. 21, 2002

(65) Prior Publication Data

US 2004/0101450 A1 May 27, 2004

(30) Foreign Application Priority Data

Aug. 18, 2000 (DE) .............................. 100 40 571

(51) Int. Cl.
*F16K 11/00* (2006.01)
(52) U.S. Cl. .................. 137/897; 137/605; 251/129.16

(58) Field of Classification Search ................ 137/606, 137/605, 892, 893, 897, 898; 417/190; 251/129.16
See application file for complete search history.

(56) References Cited

U.S. PATENT DOCUMENTS

| 1,334,355 | A | * | 3/1920 | Doland ......................... 261/59 |
| 1,829,102 | A | * | 10/1931 | McKee ....................... 137/606 |
| 2,458,508 | A | * | 1/1949 | Goetz ....................... 73/863.23 |
| 3,416,567 | A | * | 12/1968 | Tauberman et al. ......... 137/605 |
| 3,625,402 | A | * | 12/1971 | Kulis ...................... 222/129.3 |

* cited by examiner

*Primary Examiner*—Stephen M. Hepperle
(74) *Attorney, Agent, or Firm*—Ronald E. Greigg

(57) ABSTRACT

A device used in an exhaust gas posttreatment system of an internal combustion engine has a mixing chamber into which reducing agent controlled by a metering valve, and air under pressure, can be introduced. The mixing chamber is embodied in a mixing chamber body, with which a valve body of the metering valve is connected. The mixing chamber discharges into a connection stub, and the metering valve has a valve member, which to control the reducing-agent/air mixture supply means into the mixing chamber cooperates with the face end of the connection stub as a valve seat. The valve body is screwed into a bore of the mixing chamber body.

11 Claims, 2 Drawing Sheets

DEVICE FOR GENERATING A MIXTURE OF REDUCING AGENT AND AIR

CROSS-REFERENCE TO RELATED APPLICATIONS

This application is a 35 USC 371 application of PCT/DE 01/03022 filed on Aug. 7, 2001.

BACKGROUND OF THE INVENTION

1. Field of the Invention

The invention is directed to an improved device for generating a mixture of reducing agent and air for use in an internal combustion engine exhaust gas treatment system.

2. Description of the Prior Art

One device of the type with which this invention is concerned is known from the publication *Dieselmotor-Management*, Vieweg Verlag, 2nd Ed., 1998, page 31. This device is part of a system for posttreatment of exhaust gases of internal combustion engines, in particular self-igniting internal combustion engines. By the addition of a reducing agent to the exhaust gas, the effectiveness of a reduction catalytic converter for reducing nitrogen oxides in the exhaust gas can be improved. The device has a mixing chamber, into which reducing agent can be introduced through a reducing agent supply connection, controlled by a metering valve, and air can be introduced via an air supply connection. Such devices often have a complicated design, with many components, and with a large structural size. The metering valve is embodied as a separate component unit that is connected to the device. Once again this results in a large structural size and a large idle volume of the device, which is filled with the reducing agent.

SUMMARY AND ADVANTAGES OF THE INVENTION

The device of the invention has the advantage over the prior art of having a simple design and a very small structural size. The mixing chamber body and the metering valve are not connected to one another as functionally separate component units but instead functionally cooperate.

Other advantageous features and refinements of the device of the invention are disclosed. One embodiment in a simple way enables a distribution of the air entering the mixing chamber, and thus enables an effective atomization of the reducing agent and generation of the mixture of reducing agent and air. By another embodiment, the distribution of the air and thus the generation of the mixture of reducing agent and air is improved still further.

BRIEF DESCRIPTION OF THE DRAWINGS

One exemplary embodiment of the invention is explained in further detail herein below, with reference to the drawings, in which.

DESCRIPTION OF THE PREFERRED EMBODIMENTS

Figure 1:
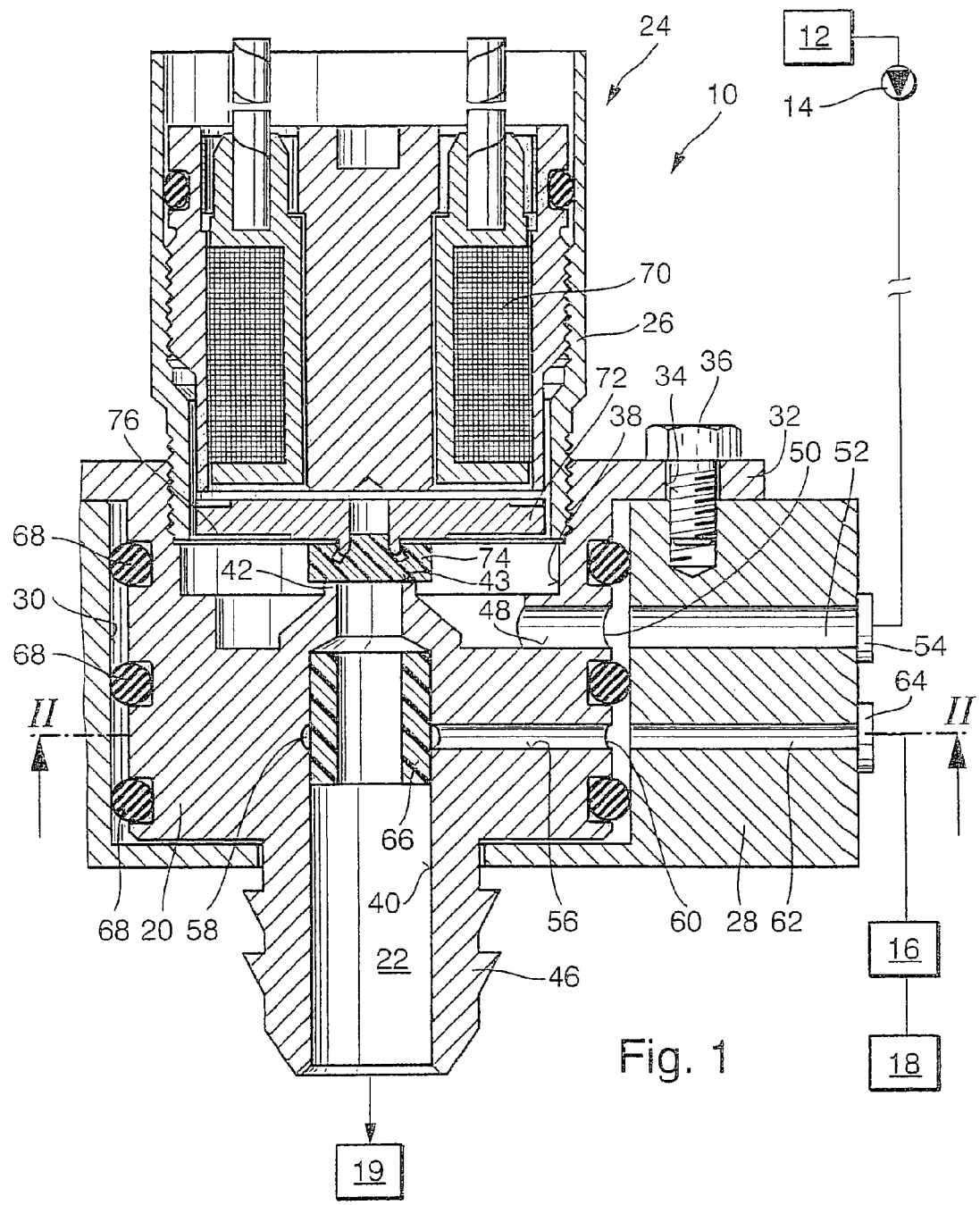
FIG. 1 shows a longitudinal section of device for generating a mixture of reducing agent and air.
Figure 2:
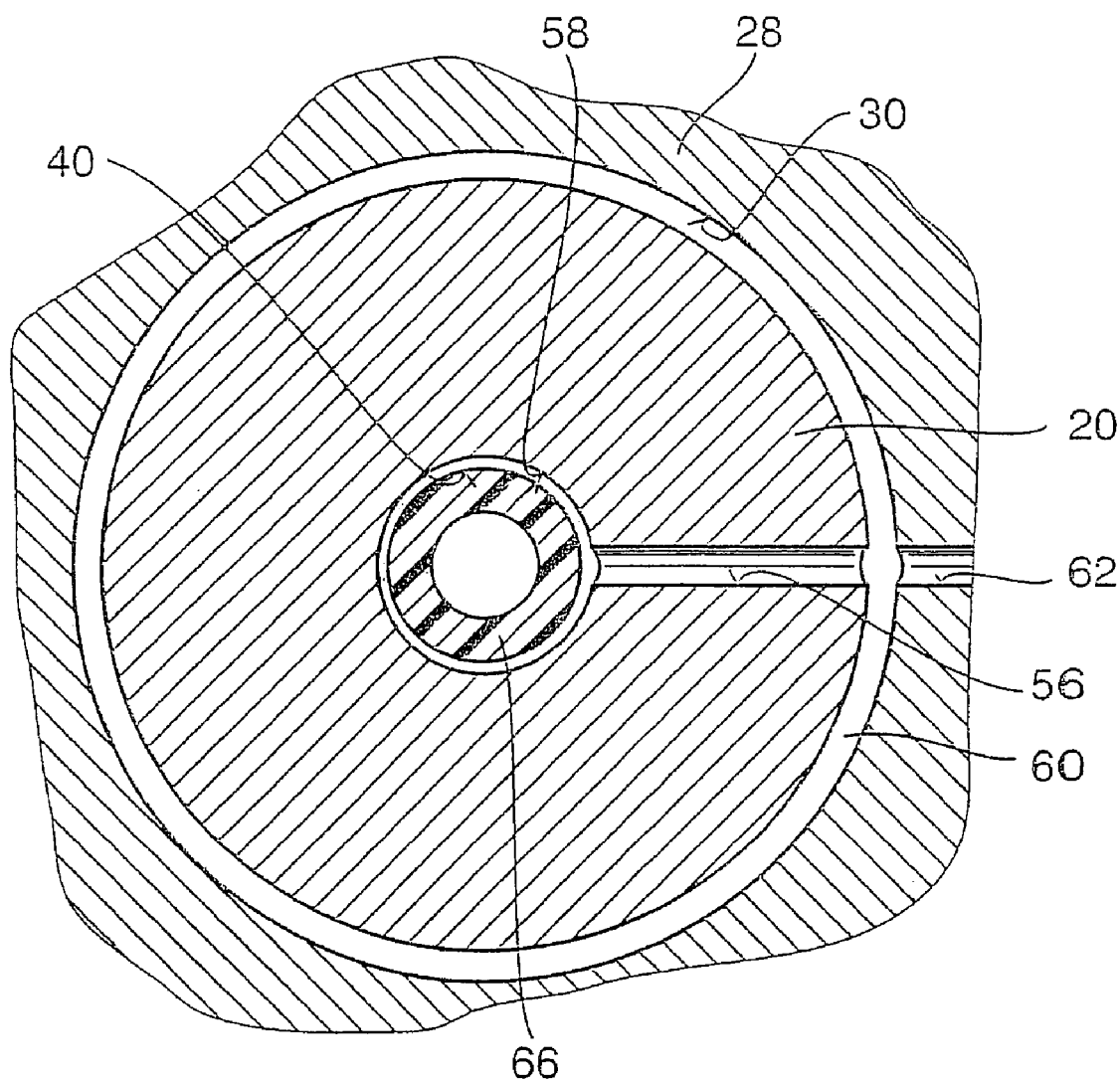
FIG. 2 shows the device in a cross section taken along the line II—II in FIG. 1.

In FIGS. 1 and 2, a device 10 for generating a mixture of reducing agent and air is shown, which is a component of a system for posttreating exhaust gas of a self-igniting internal combustion engine. The system has a container 12 for reducing agent, which can for instance be an aqueous urea solution. The liquid reducing agent is pumped to the device by means of a pump 14. The system furthermore has a compressed-air reservoir 16, into which, by means of a compressor 18, air is pumped and pressure is generated. From the compressed-air reservoir 16, compressed air is delivered to the device 10 via a line. The mixture of reducing agent and air generated by the device 10 is delivered to a reduction catalytic converter 19.

The device 10 has a mixing chamber body 20, in which a mixing chamber 22, explained in further detail hereinafter, is embodied, and a metering valve 24 that is connected to the mixing chamber body 20 and has a valve body 26. The mixing chamber body 20 and the valve body 26 are secured to a common carrier element 28. The mixing chamber body 20 has an approximately hollow-cylindrical basic shape, with the outer diameter of the mixing chamber body 20 graduated at several points. The mixing chamber body 20 is inserted into a receiving bore 30 of the carrier element 28. Outside the receiving bore 30, the mixing chamber body 20 has a flange 32, with which it comes to rest on the carrier element 28. The flange 32 has a plurality of through bores 34, through which screws 36 pass, by means of which screws the mixing chamber body 20 is secured to the carrier element 28.

The mixing chamber body 20, in its end region in which the flange 32 is embodied, has a bore 38 which in its outer end region is provided with a female thread, into which the valve body 26 of the metering valve 24, which is provided with a corresponding male thread, is screwed. The mixing chamber body 20 has a continuous bore 40, which extends toward the bore 30 within a connection stub 42 that is embodied integrally with the mixing chamber body 20. The connection stub 42 discharges into the bore 38, and the diameter of the bore 40 decreases toward the connection stub 42. The mixing chamber 22 is formed in the region of the bore 40 remote from the bore 38. The bore 40 continues, remote from the bore 38, adjoining the mixing chamber 22, in a connection stub 46 that protrudes from the receiving bore 30 of the carrier element 28. A line, not shown, that leads to the reduction catalytic converter is slipped onto the connection stub 46.

In the mixing body 20 is radial bore 48, which connects the bore 38 with the outer jacket of the mixing body 20. The mixing body 20, on its outer jacket, has an encompassing annular groove 50 into which the bore 48 opens. In the carrier element 28, a conduit 52 is embodied that discharges into the receiving bore 30 in the region of the annular groove 50 of the mixing chamber body 20. A connection 54 communicating with the conduit 52, for a line leading from the container 12 containing the reducing agent, is disposed on the carrier element 28. Thus reducing agent from the container 12 is pumped into the bore 38 of the mixing chamber body 40 by means of the pump 14, via the line communicating with the connection 54 and via the conduit 52, annular groove 50, and radial bore 48. The bore 38 forms a prechamber, into which the connection stub 42, as the connection with the mixing chamber 22, and the radial bore 48, as an inlet for the reducing agent, discharge.

A further radial bore 56 is embodied in the mixing chamber body 20, and through it the bore 40 communicates with the outer jacket of the mixing chamber body 20. The bore 40 preferably has an encompassing annular groove 58, into which the bore 56 discharges. An encompassing annular groove 60 into which the bore 56 discharges can also be embodied on the outer jacket of the mixing chamber body 20. A conduit 62 is embodied in the carrier element 28; it discharges into the receiving bore 30 in the region of the annular groove 60 of the mixing chamber body 20. A connection 64, for a line coming from the compressed-air reservoir 16, is disposed on the carrier element 28 and communicates with the conduit 62. Thus the bore 40 of the mixing chamber body 20 communicates with the compressed-air reservoir 16, via the annular groove 58, the bore 56, the annular groove 60, the conduit 62, the connection 64, and the line. In the line to the compressed-air reservoir 16, there can be a valve through which the communication of the bore 40 with the compressed-air reservoir 16 is controlled.

A sleeve 66 which is elastically compressible is pressed into the bore 40, in the region of the annular groove 58 and the bore 56. The sleeve 66 is thrust so far into the bore 40 that with its end it comes into contact with an annular shoulder, formed by the reduction in the diameter of the bore 40 toward the connection stub 42. The sleeve 66 may be of rubber or an elastic plastic. In the uncompressed state, the sleeve 66 rests tightly on the bore 40 and closes the annular groove 58 and the bore 56. When the communication between the bore 56 and the compressed-air reservoir 16 is established, the sleeve 66 is compressed by the air pressure acting in the annular groove 58, and between the sleeve 66 and the bore 40 an annular gap is created, through which compressed air can flow into the mixing chamber 22.

The mixing chamber body 20, in its outer jacket, has three further annular grooves, into which elastic sealing rings 68 are placed, through which in the receiving bore 30 of the carrier element 28 sealing of the annular grooves 50, 60 from the outside and sealing between the annular grooves 50, 60 is assured, so that the reducing agent supply means and the compressed-air supply means are separated from one another.

As already indicated above, the valve body 26 of the metering valve 24 is screwed into the bore 38. The metering valve 24 is embodied as a magnet valve, and it has an electromagnet with a magnet coil 70 disposed in the valve body 26 and with a magnet armature 72. The magnet armature 72 has a valve member 74, which cooperates at least indirectly with the face end 43 of the connection stub 42, protruding into the bore 38, as a valve seat. By way of example, at least in its end region toward the connection stub 42, the valve member 74 can comprise an elastically deformable material, such as rubber or plastic, to enable secure sealing of the connection stub 42. The magnet armature 72 with the valve member 74 is urged toward the connection stub 42 by a closing spring 76. If there is no current to the magnet coil 70, the valve member 74 is pressed by the closing spring 76 against the face end 43 of the connection stub 42 and closes it, so that no reducing agent from the bore 38 can reach the mixing chamber 22 through the connection stub 42. When current is supplied to the magnet coil 70, a magnetic field is generated, by which the magnet armature 72 is attracted, and the valve member 74 is lifted from the face end 43 of the connection stub 42, so the reducing agent from the bore 38 can reach the mixing chamber 22 through the connection stub 42.

By means of the compressed air entering through the encompassing annular gap between the sleeve 66 and the bore 40, a uniform atomization is effected in the mixing chamber 22 of the reducing agent also entering the mixing chamber 22 through the connection stub 42 and thus a mixture of reducing agent and air is generated, which exits through the connection stub 46 and is carried, through a line connected to this connection stub, to the reduction catalytic converter. The connection stub 46 can have a so-called Christmas tree profile on its outer jacket, in order to achieve a secure hold and secure sealing of the line slipped onto it.

The metering valve 24 is triggered by an electric control unit, not shown, in order to create a mixture of reducing agent and air in the mixing chamber 22 that has a concentration of reducing agent required for the particular operating conditions of the internal combustion engine, so that the reduction catalytic converter can be operated with optimal efficiency. When the connection stub 42 is closed again by the metering valve 24, it can be provided that for a certain length of time compressed air continues to be supplied to the mixing chamber 22, in order to dry it out and to avert a deposition of reducing agent in it. The device moreover has only a slight idle volume, which is constantly filled with reducing agent, the idle volume being defined in the bore 38 by the connection stub 42, the mixing chamber body 20, and the metering valve 24. This makes a fast flow rate and fast evacuation time possible, thus making it possible to change the flow quantity of the reducing agent highly dynamically. As a result, the heat output required to protect the reducing agent in the idle volume from freezing can moreover be kept low.

With the mixing chamber body 20, sleeve 66, metering valve 24, sealing rings 68, and the fastening screws 36 and the carrier element 28, the device requires only a few components, which are moreover simple to assemble. The metering valve 24 can be preassembled as a structural unit that is screwed into the female thread in the bore 38. If the metering valve 24 is replaced, it merely has to be unscrewed from the bore 38 of the mixing chamber body 20, without other components of the device having to be removed in the process.

The foregoing relates to preferred exemplary embodiments of the invention, it being understood that other variants and embodiments thereof are possible within the spirit and scope of the invention, the latter being defined by the appended claims.

I claim:

1. A device for generating a mixture of reducing agent and air, comprising:
   a mixing chamber (22) into which reducing agent, via a reducing agent supply means, controlled by a metering valve (24), and air, via an air supply means, can be introduced, the mixing chamber (22) being embodied in a mixing chamber body (20) with which a valve body (26) of the metering valve (24) communicates;
   the mixing chamber (22) discharging toward the metering valve (24) into a connection stub (42); and
   a valve member (74) in the metering valve (24) which cooperates at least indirectly with the face end (43) of the connection stub (42) as a valve seat for controlling the supply of reducing agent into the mixing chamber (22); wherein the mixing chamber (22) is embodied in a bore (40) in the mixing chamber body (20) that continues on into the connection stub (42); further comprising an elastically compressible sleeve (66) pressed into the bore (40) in a region remote from the connection stub (42) and an inlet (56) for the air discharging at the circumference of the bore (40); in the region of the sleeve (66), the sleeve (66) being compressible by the air that is supplied under pressure, so that air can reach the mixing chamber (22) through an annular gap formed between the bore (40) and the sleeve (66).

2. The device of claim 1, further comprising a prechamber (38) formed between the mixing chamber body (20) and the valve body (26), the connection stub (42) and an inlet (48) for the reducing agent discharging into the prechamber (38).

3. The device of claim 1, wherein the diameter of the bore (40) toward the connection stub (42) decreases; and wherein the sleeve (66) is pressed in as far as the transition from the bore (40) to the smaller diameter.

4. The device of claim 1, wherein the bore (40) has an annular groove (58), surrounding the sleeve (66), into which groove the inlet (56) for the air discharges.

5. The device of claim 1, wherein the valve body (26) is screwed into a threaded bore (38) in the mixing chamber body (20).

6. The device of claim 1, further comprising a connection stub (46) formed onto the mixing chamber body (20) and discharging into the mixing chamber (22), and a line for carrying away the mixture of reducing agent and air that has been created can be connected to this connection stub.

7. A device for generating a mixture of reducing agent and air, comprising:
- a mixing chamber (22) into which reducing agent, via a reducing agent supply means, controlled by a metering valve (24), and air, via an air supply means, can be introduced,
- the mixing chamber (22) being embodied in a mixing chamber body (20) with which a valve body (26) of the metering valve (24) communicates;
- the mixing chamber (22) discharging toward the metering valve (24) into a connection stub (42); and
- a valve member (74) in the metering valve (24) which cooperates at least indirectly with the face end (43) of the connection stub (42) as a valve seat for controlling the supply of reducing agent into the mixing chamber (22); a prechamber (38) formed between the mixing chamber body (20) and the valve body (26), the connection stub (42) and an inlet (48) for the reducing agent discharging into the prechamber (38), the mixing chamber body further including on its outer jacket an encompassing annular groove (50) into which the inlet (48) discharges.

8. The device of claim 7, further comprising an elastically compressible sleeve (66) pressed into the bore (40) in a region remote from the connection stub (42); and an inlet (56) for the air discharging at the circumference of the bore (40), in the region of the sleeve (66), the sleeve (66) being compressible by the air that is supplied under pressure, so that air can reach the mixing chamber (22) through an annular gap formed between the bore (40) and the sleeve (66).

9. The device of claim 8, wherein the diameter of the bore (40) toward the connection stub (42) decreases; and wherein the sleeve (66) is pressed in as far as the transition from the bore (40) to the smaller diameter.

10. The device of claim 8, wherein the bore (40) has an annular groove (58), surrounding the sleeve (66), into which groove the inlet (56) for the air discharges.

11. A device for generating a mixture of reducing agent and air, comprising:
- a mixing chamber (22) into which reducing agent, via a reducing agent supply means, controlled by a metering valve (24), and air, via an air supply means, can be introduced,
- the mixing chamber (22) being embodied in a mixing chamber body (20) with which a valve body (26) of the metering valve (24) communicates;
- the mixing chamber (22) discharging toward the metering valve (24) into a connection stub (42);
- a valve member (74) in the metering valve (24) which cooperates at least indirectly with the face end (43) of the connection stub (42) as a valve seat for controlling the supply of reducing agent into the mixing chamber (22); wherein the valve body (26) is screwed into a threaded bore (38) in the mixing chamber body (20); and a connection stub (46) formed onto the mixing chamber body (20) and discharging into the mixing chamber (22) and a line for carrying away the mixture of reducing agent and air that has been created can be connected to this connection stub.

* * * * *